United States Patent
Takada et al.

(10) Patent No.: US 12,023,882 B2
(45) Date of Patent: *Jul. 2, 2024

(54) METHOD FOR PRODUCING POLARIZING LENS, POLARIZING FILM AND POLARIZING LENS

(71) Applicant: HOYA LENS THAILAND LTD., Pathumthani (TH)

(72) Inventors: Keisuke Takada, Tokyo (JP); Aoi Matsue, Tokyo (JP); Teruo Yamashita, Tokyo (JP); Tsuyoshi Watanabe, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 190 days.

This patent is subject to a terminal disclaimer.

(21) Appl. No.: 17/394,144

(22) Filed: Aug. 4, 2021

(65) Prior Publication Data

US 2021/0370625 A1 Dec. 2, 2021

Related U.S. Application Data

(63) Continuation of application No. PCT/JP2020/024652, filed on Jun. 23, 2020.

(30) Foreign Application Priority Data

Jun. 28, 2019 (JP) ................ 2019-122173

(51) Int. Cl.
*B29D 11/00* (2006.01)
*G02B 1/08* (2006.01)
(Continued)

(52) U.S. Cl.
CPC .... *B29D 11/00442* (2013.01); *B29D 11/0048* (2013.01); *B29D 11/00644* (2013.01);
(Continued)

(58) Field of Classification Search
CPC .......... B29D 11/00442; B29D 11/0048; B29D 11/00644; G02B 1/08; G02B 5/3033
See application file for complete search history.

(56) References Cited

U.S. PATENT DOCUMENTS

| 2001/0023413 A1 | 9/2001 | Fukuma et al. |
| 2012/0243089 A1* | 9/2012 | Araki ............... B29C 41/28 |
| | | 359/487.01 |

(Continued)

FOREIGN PATENT DOCUMENTS

| EP | 2503365 A1 | 9/2012 |
| JP | 2001-311804 A | 11/2001 |

(Continued)

OTHER PUBLICATIONS

Aug. 25, 2020 Search Report issued in International Patent Application No. PCT/JP2020/024652.

*Primary Examiner* — Mathieu D Vargot
(74) *Attorney, Agent, or Firm* — Oliff PLC (57) ABSTRACT

A method for producing a polarizing lens having a high luminous transmittance and degree of polarization with astigmatism kept low, and a polarizing film and a polarizing lens. The method for producing a polarizing lens includes: contracting a polarizing film at a maximum rate of contraction of 5% or more and 30% or less under moist conditions; processing the polarizing film into a curve; drying the polarizing film at temperature $T_1$; providing a mold having a cavity in which the polarizing film is placed in the inside; injecting a curable composition into the cavity; curing the curable composition to obtain a polarizing lens in which the polarizing film is placed in the inside; and annealing the polarizing lens at temperature $T_2$, wherein a relationship between the temperature $T_1$ and the temperature $T_2$ satisfies the following expression (1): $T_1 > T_2 \ldots$ (1).

9 Claims, 3 Drawing Sheets

(51) Int. Cl.
    *G02B 5/30*           (2006.01)
    *B29L 11/00*         (2006.01)
    *G02C 7/02*           (2006.01)
    *G02C 7/12*           (2006.01)

(52) U.S. Cl.
    CPC ............. *G02B 1/08* (2013.01); *G02B 5/3033* (2013.01); *B29L 2011/0016* (2013.01); *G02C 7/022* (2013.01); *G02C 7/12* (2013.01)

(56) References Cited

U.S. PATENT DOCUMENTS

| | | |
|---|---|---|
| 2013/0155507 A1 | 6/2013 | Ryu et al. |
| 2014/0293217 A1 | 10/2014 | Ogaya et al. |
| 2016/0144582 A1 | 5/2016 | Ihara et al. |
| 2016/0176131 A1 | 6/2016 | Ihara et al. |
| 2019/0004337 A1* | 1/2019 | Tamura .................. G02C 7/108 |

FOREIGN PATENT DOCUMENTS

| | | |
|---|---|---|
| JP | 2001-330806 A | 11/2001 |
| JP | 2003-128945 A | 5/2003 |
| JP | 2014-142440 A | 8/2014 |
| JP | 2014-219491 A | 11/2014 |
| JP | 2014-219492 A | 11/2014 |
| JP | 2017-007219 A | 1/2017 |
| WO | 2012/020570 A1 | 2/2012 |
| WO | 2014/021466 A1 | 2/2014 |
| WO | 2014/077338 A1 | 5/2014 |
| WO | 2014/077339 A1 | 5/2014 |

* cited by examiner

METHOD FOR PRODUCING POLARIZING LENS, POLARIZING FILM AND POLARIZING LENS

TECHNICAL FIELD

The present disclosure relates to a method for producing a polarizing lens, a polarizing film and a polarizing lens.

BACKGROUND ART

Heretofore, polarizing lenses are known which block light in a predetermined direction of polarization reflected by water surface or the like. More specifically, for example, a polarizing lens having a polarizing film in a base material for an eyeglass lens is known (e.g., Patent Literature 1).

CITATION LIST

Patent Literature

[Patent Literature 1] Japanese Patent Laid-Open No. 2001-311804

SUMMARY

Technical Problem

For satisfying standards for use in automobile driving or because of demands for design, polarizing lenses have been required to have a high luminous transmittance. Relatively small reduction in luminous transmittance by a polarizing layer is required for functionalization such as the lamination of a photochromic layer or dyeing.

The luminous transmittances of polarizing films can be increased as the concentrations of dyes are decreased. However, there are limits on decrease in dye concentration in order to keep the degree of polarization high.

Polarizing films that are used in polarizing lenses are curved for use. Such curving is performed after the polarizing films are moistened and contracted in order to reduce strains. Unfortunately, this contraction increases the concentrations of dyes in the polarizing films and decreases their luminous transmittances.

However, if the rates of contraction of polarizing films are decreased in order to prevent their luminous transmittances become low, the polarizing films are deformed due to the annealing of eyeglass lenses in the process of producing the polarizing lenses so that the surfaces on the object side of the polarizing lenses get distorted, increasing astigmatism. Such increased astigmatism influences the eyesight of wearers.

Accordingly, one embodiment of the present disclosure relates to a method for producing a polarizing lens having a high luminous transmittance and degree of polarization with astigmatism kept low, and a polarizing film and a polarizing lens.

Solution to Problem

It has been found that a polarizing lens having a high luminous transmittance and degree of polarization with astigmatism kept low can be obtained by setting the maximum rate of contraction of a polarizing film to be contracted under moist conditions to a predetermined range, drying the polarizing film after processing at temperature $T_1$, and setting the relationship between the temperature $T_1$ and annealing temperature $T_2$ to $T_1 > T_2$.

Specifically, one embodiment according to the present disclosure provides a method for producing a polarizing lens, comprising:
contracting a polarizing film at a maximum rate of contraction of 5% or more and 30% or less under moist conditions;
processing the polarizing film into a curve;
drying the polarizing film at temperature $T_1$;
providing a mold having a cavity in which the polarizing film is placed in the inside;
injecting a curable composition into the cavity;
curing the curable composition to obtain a polarizing lens in which the polarizing film is placed in the inside; and
annealing the polarizing lens at temperature $T_2$, wherein
a relationship between the temperature $T_1$ and the temperature $T_2$ satisfies the following expression (1):

$$T_1 > T_2 \tag{1}.$$

One embodiment according to the present disclosure provides a method for producing a curved polarizing film, comprising:
contracting a polarizing film at a maximum rate of contraction of 5% or more and 30% or less under moist conditions;
processing the polarizing film into a curve; and
drying the polarizing film at temperature $T_1$, wherein
the temperature $T_1$ is 130° C. or higher and 150° C. or lower.

One embodiment according to the present disclosure provides a polarizing film obtained by the production method mentioned above.

One embodiment according to the present disclosure provides a polarizing lens comprising:
a first lens element part constituting an object-side surface;
a second lens element part constituting an eyeball-side surface; and
the polarizing film mentioned above disposed between the first lens element part and the second lens element part.

In the embodiments mentioned above, the following is preferred.

The temperature $T_1$ may be 120° C. or higher and 160° C. or lower.

The temperature $T_2$ may be 100° C. or higher and 130° C. or lower.

The polarizing lens may have a glass transition temperature of 80° C. or higher and 150° C. or lower.

The provision of the mold mentioned above may comprise placing an upper mold, the polarizing film after the drying, and a lower mold at respective intervals in the presented order, and closing the intervals between the upper mold and the lower mold with a sealing member.

A minimum value of a distance between the side of the cavity of the upper mold and the polarizing film may be 0.05 mm or larger and 2.0 mm or smaller. The polarizing lens may have a negative power.

Advantageous Effects

One embodiment of the present disclosure can provide a method for producing a polarizing lens having a high luminous transmittance and degree of polarization with astigmatism kept low, and a polarizing film and a polarizing lens.

DESCRIPTION OF EMBODIMENTS

Hereinafter, the mode for carrying out the present disclosure (hereinafter, referred to as the "present embodiment") will be described in detail with reference to the drawings, if necessary. However, the present disclosure is not limited thereby. Various changes or modifications can be made in the present disclosure without departing from the spirit of the present disclosure. In the drawings, the same reference sign designates the same element, and overlapping description is omitted. The positional relationships indicated by terms such as "up", "down", right", and "left" are based on the positional relationships shown in the drawings, unless otherwise specified. The dimensional ratios of the drawings are not limited to the ratios shown therein.

The method for producing a polarizing lens according to the present embodiment comprises:

contracting a polarizing film at a maximum rate of contraction of 5% or more and 30% or less under moist conditions;

processing the polarizing film into a curve;

drying the polarizing film at temperature $T_1$;

providing a mold having a cavity in which the polarizing film is placed in the inside;

injecting a curable composition into the cavity;

curing the curable composition to obtain a polarizing lens in which the polarizing film is placed in the inside; and annealing the polarizing lens at temperature $T_2$.

In the method for producing a polarizing lens according to the present embodiment, a relationship between the temperature $T_1$ and the temperature $T_2$ satisfies the following expression (1):

$$T_1 > T_2 \qquad (1).$$

The production method of the present embodiment thus configured produces a polarizing lens having a high luminous transmittance and degree of polarization with astigmatism kept low In the present disclosure, various terms are as defined below.

The "object-side surface" is a surface positioned on the object side when eyeglasses having a polarizing lens are worn by a wearer. The "eyeball-side surface" is a surface positioned on a side opposite thereto, i.e., on the eyeball side when eyeglasses having a polarizing lens are worn by a wearer. As for a form, in one aspect, the object-side surface is convex, and the eyeball-side surface is concave. However, the present disclosure is not limited by this aspect.

The "maximum rate of contraction" is the rate of contraction of a polarizing film represented by the following expression, and is the rate of contraction in a direction in which the value is maximized.

Rate of contraction (%)=([Width of the polarizing film before contraction]−[Width of the polarizing film after contraction])/[Width of the polarizing film before contraction]× 100

In one aspect, a polarizing film obtained by drawing a film containing a dichroic dye is used. In this case, the maximum rate of contraction is the rate of contraction in the direction of this drawing. However, the present disclosure is not limited by this aspect.

[Polarizing Lens]

Figure 1:
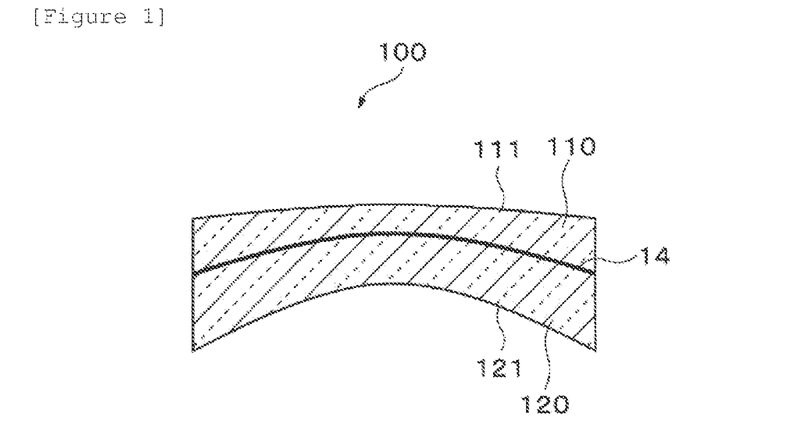
FIG. 1 is a cross-sectional view of polarizing lens 100 of the present embodiment.

FIG. 1 is a cross-sectional view of polarizing lens 100 of the present embodiment. As shown in FIG. 1, the polarizing lens 100 of the present embodiment is a plastic lens having a meniscus shape, and has a lens base material (laminated structure) having first lens element part 110, second lens element part 120, and curved polarizing film 14 between both the lens element parts. The first lens element part 110 is disposed on object-side surface 111 (convex side) of the polarizing lens 100 with respect to the polarizing film 14, and the second lens element part 120 is disposed on eyeball-side surface 121 (concave side) of the polarizing lens 100. Both the first lens element part 110 and the second lens element part 120 constituting the resin base material (base material) of the polarizing lens 100 have a meniscus shape. In the first lens element part 110, the object side provides the object-side surface ill of the polarizing lens 100, and the eyeball side provides a surface contacted with the polarizing film 14. Likewise, in the second lens element part 120, the eyeball side provides the eyeball-side surface 121 of the polarizing lens 100, and the object side provides a surface contacted with the polarizing film 14.

For example, a polarizing film obtained by curving a commercially available iodine polarizing film at a predetermined curvature by press molding so as to correspond to a lens shape, and cutting the outline to a round shape can be used as the polarizing film 14 to be buried in the inside of the polarizing lens 100. The detailed curving will be mentioned later.

Minimum value W1 of the distance between the object-side surface 111 and the polarizing film 14 of the polarizing lens 100 may be 0.05 mm or larger and 2.0 mm or smaller. The position that attains the minimum value W1 differs depending on the shape of the polarizing lens based on the prescription of the lens, etc. In short, in the case of a lens having a negative power, the lens thickness is increased along a direction toward the periphery from the center. A lens having a positive power is opposite therein to this.

Figure 2:
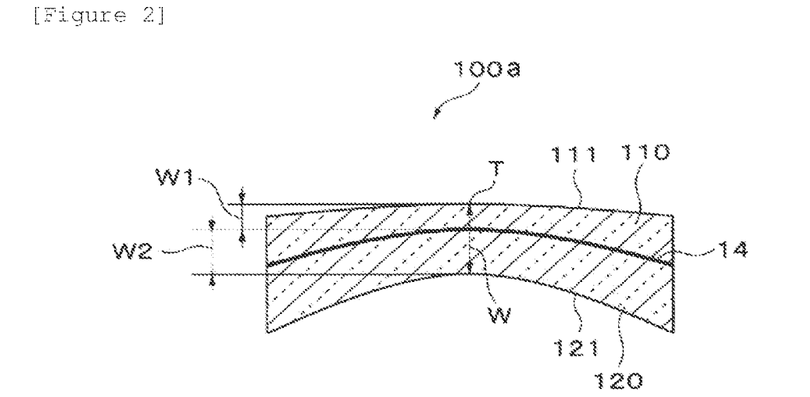
FIG. 2 is a cross-sectional view of polarizing lens 100a of the present embodiment having a negative power.

FIG. 2 is a cross-sectional view of polarizing lens 100a of the present embodiment having a negative power. The polarizing lens 100a shown in FIG. 2 is a single-vision lens having a base curve of 2 bases, a curvature of 3 bases in the polarizing film 14, and a negative power as a prescribed power. In the polarizing lens 100a having a negative power, the distance between top T at the center of the object-side surface 111 and the polarizing film 14 is the minimum value W1 mentioned above, and the distance between the top T and the polarizing film 14 is 0.05 mm or larger and 2.0 mm or smaller. The minimum value W1 may be 0.1 mm or larger and 1.0 mm or smaller, 0.3 mm or larger and 0.7 mm or smaller, or 0.2 mm or larger and 0.6 mm or smaller. The top T is a geometric center for spherical surface design and is an optical center.

In general, polarizing lenses having a polarizing film tend to be thick as a whole. For example, the polarizing lens 100a shown in FIG. 2 has a structure where the eyeball-side surface 121 is provided with a curve and the wall thickness at the optical center of the eyeglass lens is smallest with a thick rim. The polarizing lens 100a cannot be thinner than the thickness from the object-side surface 111 to the position of the polarizing film. In short, the wall thickness at the optical center which is smallest in the polarizing lens 100a is limited to the thickness from the object-side surface 111 to the position of the polarizing film 14. Furthermore, the thickness of the rim becomes conspicuous in association with the wall thickness at the optical center so that the polarizing lens makes the impression that the polarizing lens is thick as a whole. From such a viewpoint, the polarizing film 14 may be placed at a position as close as possible to the surface on the object side of the polarizing lens. Accordingly, the curving of the polarizing film allows even the central portion of the polarizing lens to be placed at a position as close as possible to the surface on the object side, and can decrease the wall thickness of the central portion.

Figure 3:
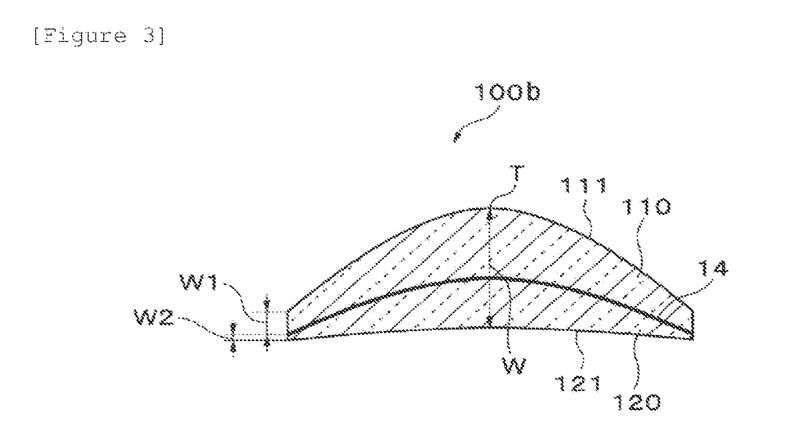
FIG. 3 is a cross-sectional view of polarizing lens 100b of the present embodiment having a positive power.

FIG. 3 is a cross-sectional view of polarizing lens 100b of the present embodiment having a positive power. The polarizing lens 100b shown in FIG. 3 is a single-vision lens having a base curve of 10 bases, a curvature of 8 bases in the polarizing film 14, and a positive power as a prescribed power. In the lens 100b having a positive power, the distance between the polarizing film 14 and the periphery is the minimum value W1 mentioned above, and the distance between the periphery and the polarizing film 14 is 0.05 mm or larger and 2.0 mm or smaller. The minimum value W1 may be 0.1 mm or larger and 1.0 mm or smaller, 0.3 mm or larger and 0.7 mm or smaller, or 0.2 mm or larger and 0.6 mm or smaller.

In the polarizing lens of type in which the polarizing film is sandwiched in two lens element parts, as shown in FIG. 1, the refracting surface of the object-side surface 111 of the first lens element part 110 may be a rotationally symmetric surface, or a spherical surface. This is because mold production or the curving of the polarizing film becomes easy.

According to the present embodiment, the minimum value of a clearance which is the distance between the object-side surface 111 and the polarizing film 14 is easily set to 0.05 mm or larger and 2.0 mm or smaller by using a highly refractive lens monomer having a refractive index of 1.60 or more, and setting the difference between the polarizing film and the curve of the object-side surface 111 to within 2 bases. As a result, a polarizing lens having small minimum value W1 (e.g., 1.1 mm) mentioned above can be obtained.

The polarizing lens may be any of a finished lens and a semi-finished lens.

The polarizing lens may be any of a single-vision lens, a multifocal lens, a progressive power lens, and the like. As one example, in the progressive power lens, usually, a reading point region (reading point) and a progressive region (intermediate region) are included in the lower region mentioned above, and a distance point region (distance point) is included in the upper region.

A colorless polarizing lens is usually used, whereas a colored polarizing lens may be used without impairing transparency.

The thickness and diameter of the base material of the polarizing lens are not particularly limited. The thickness is usually on the order of 1 to 30 mm, and the diameter is usually on the order of 50 to 100 mm.

Refractive index ne of the base material of the polarizing lens may be 1.50 or more, 1.53 or more, 1.55 or more, or 1.60 or more. The upper limit of the refractive index ne of the base material of the polarizing lens is not particularly limited and may be 1.80 or less.

The polarizing lens according to the present embodiment may have a glass transition temperature. The glass transition temperature may be 80° C. or higher and 150° C. or lower, 90° C. or higher and 140° C. or lower, or 100° C. or higher and 130° C. or lower. When the glass transition temperature falls within the range, the annealing temperature of the polarizing lens mentioned later can be decreased. Therefore, the deformation of the polarizing film can be prevented.

In this context, the glass transition temperature of the polarizing lens means the glass transition temperature of the base material of the polarizing lens.

The glass transition temperature according to the present embodiment can be measured by the following thermomechanical analysis method (TMA method).

(Thermomechanical Analysis Method)

The displacement of a sample is measured by the application of a load of 98 mN to a penetration probe (tip diameter: 0.5 to 1.0 mm) to measure a glass transition temperature. The measurement is performed by elevating the temperature of a φ5 mm×3 mm sample from room temperature at a rate of 10° C./min, and measuring the displacement of the sample in a thermomechanical analysis apparatus. Usually, the sample is increased in size by thermal expansion in association with the temperature elevation. However, the measurement value may show that the sample shifts from expansion to contraction around the glass transition temperature. This is a phenomenon that occurs when the sample no longer bears the load so that the penetration probe is pressed onto the sample. This peak top temperature is defined as glass transition temperature Tg. If no peak top is clear, the temperature at a point where tangent lines before and after the measurement value around the peak top intersect each other is regarded as the glass transition temperature.

The polarizing lens according to the present embodiment may have a luminous transmittance of 30% or more. The possession of the luminous transmittance of 30% or more facilitates satisfying demands for design and can enhance the freedom of setting of the luminous transmittance in consideration of the formation of other layers. The polarizing lens having an increased luminous transmittance has excellent chromogenic properties even when dyed with a dark color dye (e.g., a blue dye and a green dye) having low chromogenic properties. The luminous transmittance of the polarizing lens may be 31% or more, or 32% or more. The upper limit of the luminous transmittance of the polarizing lens is not particularly limited and may be 60% or less, may be 50% or less, may be 40% or less, or may be 35%, from the viewpoint of easy production. The luminous transmittance of the polarizing lens means the total luminous transmittance including that of a functional layer when the polarizing lens has the functional layer. The luminous transmittance is measured in accordance with JIS T7333: 2005.

The polarizing lens according to the present embodiment may have a degree of polarization of 90% or more. The possession of the degree of polarization of 90% or more produces performance sufficient as a polarizing lens, such as the cutoff of reflected light. The degree of polarization of the polarizing lens may be 93% or more, 95% or more, or 96% or more. The degree of polarization can be measured by a method described in Examples.

The polarizing lens according to the present embodiment may have astigmatism of 0.14 or less. The possession of the astigmatism of 0.14 or less yields a polarizing lens that allows an eyeglasses wearer to feel no or a little poor wearing.

The astigmatism of the polarizing lens may be 0.09 or less, 0.07 or less, 0.05 or less, 0.04 or less, or 0.03 or less. The lower limit of the astigmatism of the polarizing lens is not particularly limited and may be 0.01 or more or may be 0.02 or more, from the viewpoint of easy production. The astigmatism means the astigmatism of the object-side surface. The astigmatism can be measured by a method described in Examples.

<Functional Layer>

The polarizing lens may have a functional layer. Examples of the functional layer mentioned above include hard coat layers, underlayers, antireflective layers, ultraviolet absorption layers, infrared absorption layers, photochromic layers, antistatic layers, and antifog layers. One of these functional layers may be used singly, or two or more thereof may be used in combination. Techniques known in the art regarding eyeglass lenses can be applied to these functional layers. Among them, a hard coat layer, an underlayer, and an antireflective layer may be carried by the polarizing lens.

(Hard Coat Layer)

The hard coat layer is, for example, a cured membrane of a hard coat composition containing an inorganic oxide and a silicon compound. The hard coat composition may further contain a polyfunctional epoxy compound.

Examples of the inorganic oxide include silicon oxide, aluminum oxide, titanium oxide, zirconium oxide, tungsten oxide, zinc oxide, tin oxide, beryllium oxide, antimony oxide, and complex oxides of two or more of these inorganic oxides. One of these inorganic oxides may be used singly, or two or more thereof may be used in combination. Among these inorganic oxides, silicon oxide is preferred. Colloidal silica may be used as the inorganic oxide.

The content of the inorganic oxide may be 20% by mass or more and 80% by mass or less, 25% by mass or more and 70% by mass or less, or 25% by mass or more and 50% by mass or less, in the solid content of the hard coat composition.

The silicon compound is, for example, a silicon compound having a hydrolyzable group such as an alkoxy group. The silicon compound may be a silane coupling agent having an organic group bonded to a silicon atom, and a hydrolyzable group. The organic group bonded to a silicon atom may be an organic group having a functional group such as an epoxy group (e.g., a glycidoxy group), a vinyl group, a methacryloxy group, an acryloxy group, a mercapto group, an amino group, or a phenyl group, and may be an organic group having an epoxy group. The silicon compound may have an alkyl group bonded to silicon.

Examples of a commercially available product of the silane coupling agent mentioned above include product names KBM-303, KBM-402, KBM-403, KBE-402, KBE-403, KBM-1403, KBM-502, KBM-503, KBE-502, KBE-503, KBM-5103, KBM-602, KBM-603, KBM-903, KBE-903, KBE-9103, KBM-573, KBM-575, KBM-9659, KBE-585, KBM-802, KBM-803, KBE-846, and KBE-9007 manufactured by Shin-Etsu Chemical Co., Ltd.

The content of the silicon compound may be 20% by mass or more and 90% by mass or less, 0% by mass or more and 75% by mass or less, or 50% by mass or more and 75% by mass or less, in the solid content of the hard coat composition.

The polyfunctional epoxy compound is a polyfunctional epoxy compound containing two or more epoxy groups in one molecule, or a polyfunctional epoxy compound containing two or three epoxy groups in one molecule. Examples of a commercially available product of the polyfunctional epoxy compound include product names EX-201, EX-211, EX-212, EX-252, EX-313, EX-314, EX-321, EX-411, EX-421, EX-512, EX-521, EX-611, EX-612, EX-614, and EX-614B of "DENACOL" series manufactured by Nagase ChemteX Corp.

The content of the polyfunctional epoxy compound may be 0% by mass or more and 50% by mass or less, 10% by mass or more and 40% by mass or less, or 15% by mass or more and 30% by mass or less, in the solid content of the hard coat composition.

The hard coat composition mentioned above can be prepared by mixing the components described above as well as, if necessary, optional components such as an organic solvent, a leveling agent, and a curing catalyst.

The hard coat layer mentioned above can be formed by applying a curable composition onto a base material, followed by curing treatment (heat curing, photocuring, etc.). A method usually performed, such as a dipping method, a spin coating method, or a spraying method can be applied to an approach of applying the curable composition. The curing treatment is usually performed by heating as to a curable composition containing the polyfunctional epoxy compound. The curing treatment by heating can be performed, for example, by placing a lens coated with the curable composition mentioned above for approximately 30 minutes to 3 hours in an environment of an atmospheric temperature of 50 to 150° C.

(Under Layer)

The underlayer mentioned above can be formed from, for example, an aqueous resin composition containing particles of at least one resin selected from the group consisting of polyurethane resin, acrylic resin, and epoxy resin.

Commercially available aqueous polyurethane may be used, either as it is or after being diluted, if necessary, with an aqueous solvent, as the aqueous resin composition mentioned above. Examples of the commercially available aqueous polyurethane include product name "EVAFANOL" series manufactured by Nicca Chemical Co., Ltd., product name "SUFERFLEX" series manufactured by DKS Co. Ltd., product name "ADEKA BONTIGHTER" series manufactured by ADEKA Corp., product name "OLESTER" series manufactured by Mitsui Chemicals, Inc., product name "VONDIC" series and product name "HYDRAN" series manufactured by DIC Corp., product name "Impranil" series manufactured by Bayer Holding Ltd., product name "SOFLANATE" series manufactured by Nihon Soflan Chemical & Engineering Co., Ltd., product name "POIZ" series manufactured by Kao Corp., product name "Sunprene" series manufactured by Sanyo Chemical Industries, Ltd., product name "Izelux" series manufactured by Hodogaya Chemical Co., Ltd., and product name "NeoRez" series manufactured by AstraZeneca K.K.

The underlayer can be formed, for example, by coating the surface of a base material with the aqueous resin composition mentioned above, followed by drying.

(Antireflective Layer)

The antireflective layer has, for example, a low-refractive index layer and a high-refractive index layer alternately arranged. The number of layers carried by the antireflective layer may be 4 to 11 layers, or 5 to 8 layers.

The refractive index of the low-refractive index layer may be 1.35 to 1.80, or 1.45 to 1.50, at a wavelength of 500 to 550 nm. The low-refractive index layer is made of an inorganic oxide, or silicon oxide.

The refractive index of the high-refractive index layer may be 1.90 to 2.60, or 2.00 to 2.40, at a wavelength of 500 to 550 nm. The high-refractive index layer is made of, for example, an inorganic oxide. The inorganic oxide for use in the high-refractive index layer may be at least one inorganic oxide selected from the group consisting of zirconium oxide, tantalum oxide, yttrium oxide, titanium oxide, niobium oxide and aluminum oxide, or at least one inorganic oxide selected from the group consisting of zirconium oxide and tantalum oxide.

The antireflective layer can be formed by alternately laminating the low-refractive index layer and the high-refractive index layer by a vacuum deposition method.

The dyed polarizing lens according to the present embodiment is obtained by dyeing the polarizing lens mentioned above. Examples of the polarizing lens to be dyed include, but are not particularly limited to, polarizing lenses having the lens base material mentioned above or the functional layer (or the hard coat layer) mentioned above and the lens base material. The dyeing may be performed with any color such as blue color, red color, green color, or yellow color and may be performed with a dark color such as blue color or green color. Although the dark color is difficult to develop, the polarizing lens according to the present embodiment has a high luminous transmittance and thus exhibits excellent chromogenic properties even when dyed with such a color. The dyeing can be performed by a method known in the art.

[Method for Producing Polarizing Lens]

Next, the method for producing a polarizing lens according to the present embodiment will be described with reference to the drawings.

Figure 4:
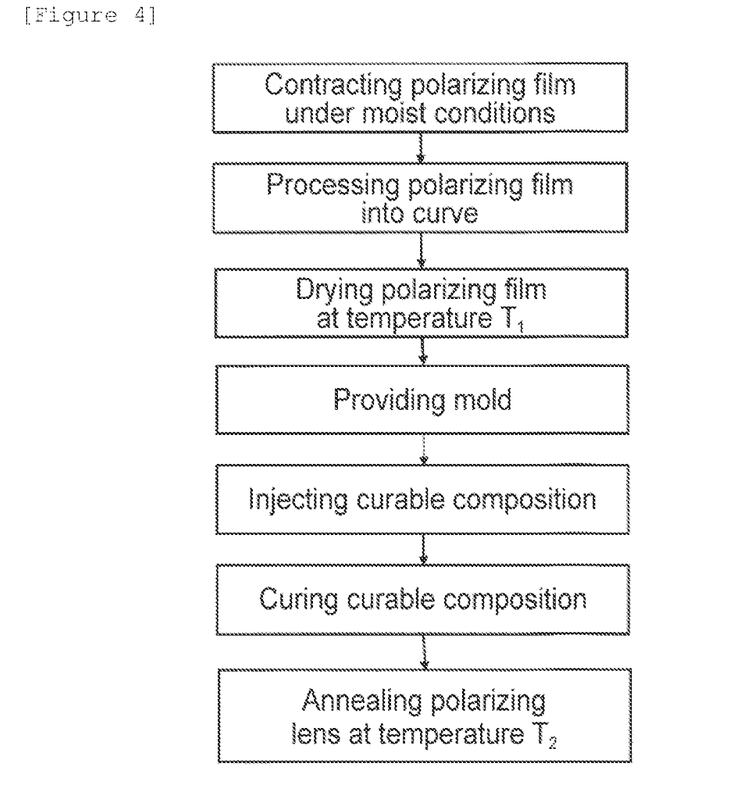
FIG. 4 is a flow chart summarizing the method for producing a polarizing lens according to the present embodiment.

FIG. 4 is a flow chart summarizing a method for producing a polarizing lens according to the present embodiment.

The method for producing polarizing lens 100 according to the present embodiment comprises the steps of: contracting polarizing film 14 at a maximum rate of contraction of 5% or more and 30% or less under moist conditions; processing the polarizing film 14 into a curve; drying the polarizing film 14 at temperature $T_1$; providing a mold having a cavity in which the polarizing film 14 is placed in the inside; injecting a curable composition into the cavity; curing the curable composition to obtain polarizing lens 100 in which the polarizing film 14 is placed in the inside; and annealing the polarizing lens 100 at temperature $T_2$. The method for producing polarizing lens 100 according to the present embodiment may comprise the steps mentioned above in the presented order.

In the case of producing a semi-lens (not shown), eyeball-side surface 121 of the polarizing lens 100 thus annealed may be ground and polished according to a prescription. The method may have the step of then forming a functional layer on the surface of the polarizing lens 100. The polarizing lens is edged into the desired frame shape and framed.

<Polarizing Film>

The polarizing film may be a drawn film containing a dichroic dye and a resin such as polyvinyl alcohol (hereinafter, also simply referred to as "PVA") or polyethylene terephthalate (hereinafter, also simply referred to as "PET"). Among these resins, PVA is preferred. PVA is excellent in transparency, heat resistance, affinity for a dichroic dye such as iodine, and orientation at the time of drawing, and is therefore preferred as a material for the polarizing film. The polarizing layer of the polarizing film is obtained by drawing, in a monoaxial direction, a resin film impregnated with iodine in the resin.

The polarizing film may have a protective layer on one or both of the surfaces of the drawn film. Examples of the protective layer include films containing a triacetylcellulose film (hereinafter, also referred to as "TAC").

The thickness of the polarizing film is not particularly limited as long as the film is capable of being curved. The thickness may be 10 μm or larger and 500 μm or smaller, 15 μm or larger and 200 μm or smaller, 20 μm or larger and 100 μm or smaller, or 20 μm or larger and 50 μm or smaller. When the thickness is 10 μm or larger, the film has strong rigidity and is easily handled. When the thickness is 500 μm or smaller, the polarizing film is easily curved.

<Contraction Under Moist Conditions; Maximum Rate of Contraction>

First, the polarizing film is contracted under moist conditions. This is because the step facilitates curving the polarizing film.

The maximum rate of contraction of the polarizing film is 5% or more and 30% or less with respect to the polarizing film before moistening. When the maximum rate of contraction falls within the range, decrease in luminous transmittance by the contraction of the polarizing film is suppressed. Furthermore, strain is moderately removed, and astigmatism can be kept low by combination with drying conditions mentioned later. The maximum rate of contraction of the polarizing film may be 5% or more and 20% or less, 8% or more and 18% or less, 10% or more and 16% or less, or 12% or more and 15% or less.

The moistening can be performed by a method, for example, of leaving the polarizing film for a predetermined time in a constant temperature and humidity apparatus or of spraying water in a mist form to the polarizing film. The method is not particularly limited as long as the water content of the polarizing film can be increased. The moistening is usually performed in a heated atmosphere on the order of 50 to 90° C.

The moistened polarizing film may be cooled for curving in a state where most of absorbed water is held in the film. For example, the polarizing film taken out of the constant temperature and humidity apparatus is left, as it is, at room temperature (on the order of 20 to 25° C.) to cool the polarizing film.

<Curving of Polarizing Film>

Any method can be adopted for the curving of the polarizing film as long as the method can prepare the film shape as the desired curve shape. Preferred examples of the method include a press molding method. For example, the polarizing film in a state placed on a convex mold is pressed so that the convex form is transferred to the polarizing film to obtain polarizing film 14 having a curve shape.

More specifically, for example, the polarizing film in a planar sheet form is tucked into a press molding apparatus having a temperature adjustment part (heater, cooling medium, etc.) and a pressurization part, and having a mold with a pair of a male mold having a spherical molding surface and a female mold, and pressed so that the polarizing film is curved in the shape of the molding surface.

Figure 5:
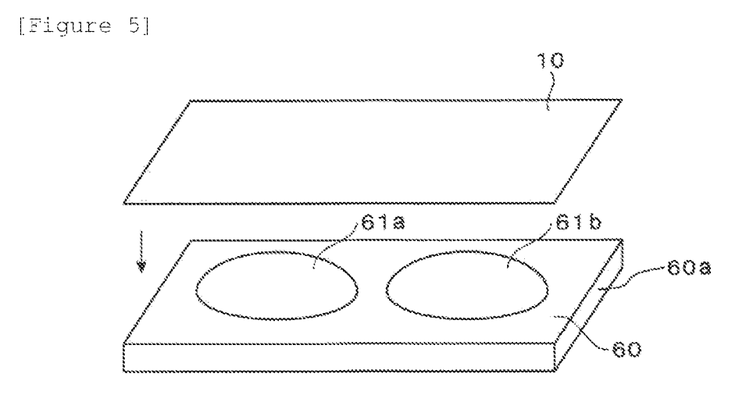
FIG. 5 is a schematic configuration diagram of a curving table having a male mold having a spherical molding surface.

FIG. 5 is a schematic configuration diagram of a curving table having a male mold having a spherical molding surface. Curving table 60 has processing base part 60a, first male mold part 61a having a spherical molding surface, and second male mold part 61b. In the drawing, two male mold parts are shown. However, the number thereof is not particularly limited. The first male mold part 61*a* and the second male mold part 61*b* may be configured for eyeglass lenses for the right and left eyes.

Polarizing film 10 in a planar sheet form is placed on the processing base part 60*a*, and a female mold (not shown) is pressed thereagainst. The curve shape is transferred to the polarizing film, for example, by pressing at room temperature (on the order of 20 to 25° C.). In this way, the polarizing film 14 is curved.

The polarizing film 14 may be curved so as to correspond to the shape of the object-side surface 111. The curvature of the curve of the polarizing film 14 may be formed so as to correspond to the base curve of the object-side surface 111 of the polarizing lens 100 to be produced. When a prescribed lens has a form other than a spherical surface, as in a progressive lens, a non-spherical surface lens, or the like, the curve may have a form appropriate for the shape of the object-side surface 111. The curvature of the curve of the polarizing film 14 may differ from that of the base curve of the polarizing lens 100. In the case of a semi-finished lens, the curvature may differ from that of the base curve of the object-side surface 111 of the polarizing lens 100 within a range that permits grinding or polishing of the eyeball-side surface 121.

The polarizing film 14 has a base curve of, for example, 1.0 base or more and 10.0 bases or less. The base curve may be, for example, 2.0 bases or more and 8.0 bases or less.

The absolute value of the difference between the base curve of the polarizing film 14 and the base curve of the object-side surface 111 of the polarizing lens 100 may be 2.0 bases or less, 1.5 bases or less, or 1.0 base or less.

<Drying of Polarizing Film; Temperature $T_1$>

In the production method of the present embodiment, the polarizing film 100 thus curved is dried at temperature $T_1$. In the present embodiment, the temperature $T_1$ refers to the temperature of an atmosphere in which heating treatment for the drying is performed. In the present embodiment, the polarizing film may be markedly deformed because the rate of contraction of the polarizing film is decreased in order to maintain the high luminous transmittance of the polarizing film. Such deformation of the polarizing film can be prevented by setting the temperature $T_1$ so as to satisfy conditions of the expression (1) mentioned later. The drying described above can be performed in the atmosphere.

The temperature $T_1$ may be higher than 120° C. and 160° C. or lower. When the temperature $T_1$ is higher than 120° C., the deformation of the polarizing film can be prevented. When the temperature $T_1$ is 160° C. or lower, the polarizing film can be prevented from being discolored or cracked. The temperature $T_1$ may be 125° C. or higher and 155° C. or lower, 130° C. or higher and 150° C. or lower, or 135° C. or higher and 145° C. or lower.

Various methods can be adopted as methods for the drying. A scheme of placing the polarizing film in a hot air circulating oven heated to the temperature $T_1$, followed by the application of hot air thereto can be used. The drying time is not particularly limited. For the drying, the polarizing film may be dried after removal of the curving mold or may be dried in a state put in the mold.

<Provision of Mold>

The production method of the present embodiment comprises providing a mold having a cavity in which the polarizing film is placed in the inside. The production method of the present embodiment produces the polarizing lens by use of, for example, a cast polymerization method (casting method). The casting method is a method of curing a curable composition in a cavity formed from an upper mold, a lower mold, and a sealing member which adjusts the distance between the upper mold and the lower mold and determines a lens thickness, to obtain a polarizing lens.

Figure 6:
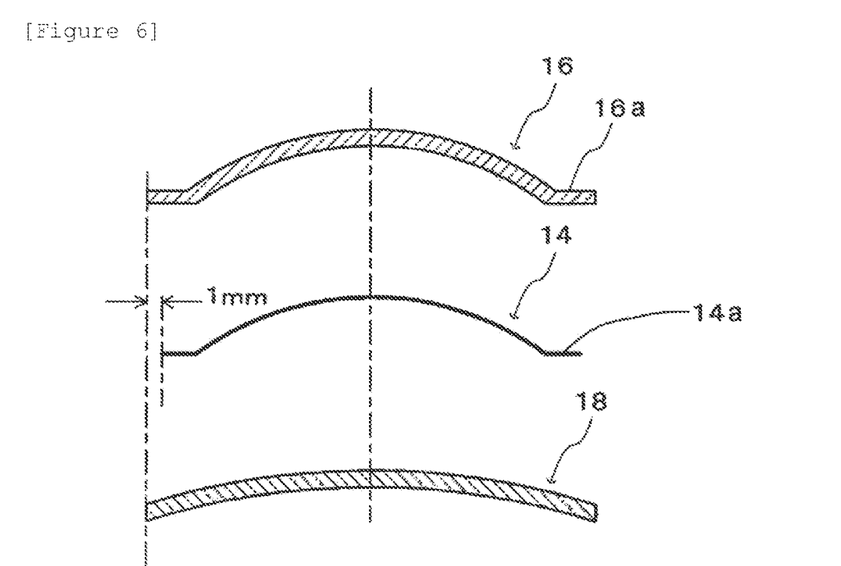
FIG. 6 is a schematic cross-sectional view of upper mold 16, polarizing film 14 after drying, and lower mold 18.

FIG. 6 is schematic cross-sectional view of upper mold 16, polarizing film 14 after drying, and lower mold 18. The polarizing film 14 after drying may have a diameter smaller by approximately 2 mm than that of the upper mold 16 and the lower mold 18. This allows a curable composition mentioned later to come around on both sides of the polarizing film 14 in the injection of the curable composition. Thus, the curable composition can be smoothly injected into the cavity.

Figure 7:
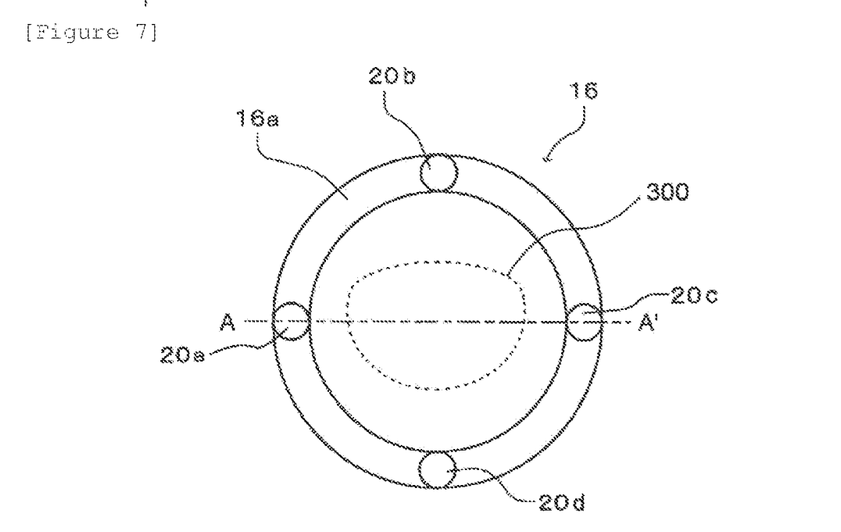
FIG. 7 is a planar view showing the formed state of holding member 20 made of an adhesive for holding the polarizing film 14 in the upper mold 16.
Figure 8:
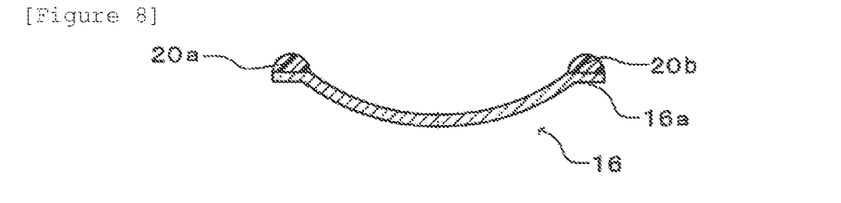
FIG. 8 is a schematic cross-sectional view taken along the A-A' line of the formed state of the holding member 20 made of an adhesive for holding the polarizing film 14 in the upper mold 16.

FIG. 7 is a planar view showing the formed state of holding member 20 made of an adhesive for holding the polarizing film 14 in the upper mold 16. FIG. 8 is a schematic cross-sectional view taken along the A-A' line of the formed state of the holding member 20 made of an adhesive for holding the polarizing film 14 in the upper mold 16.

The upper mold 16 may have flange part 16*a* having a planar shape in the rim. In FIG. 7, holding members 20*a*, 20*b*, 20*c*, and 20*d* for holding the polarizing film 14 are arranged at four locations at 90° intervals on the side of the cavity of the flange part 16*a* of the upper mold 16. These holding members 20*a*, 20*b*, 20*c*, and 20*d* are for bonding and supporting the polarizing film. When the polarizing film is placed on these holding members 20*a*, 20*b*, 20*c*, and 20*d*, the height and position of adhesive columns are controlled such that the polarizing film can be held while a predetermined clearance (interval) is maintained so as not to come into contact with the side of the cavity of the upper mold 16. Since the polarizing lens is cut according to lens shape 300 of an eyeglass frame for framing, the holding member 20 is configured so as not to remain in the polarizing lens after the framing process. Use of the holding member holds the polarizing film 14 while maintaining a predetermined interval (hereinafter, referred to as a "clearance") without the contact between the surface of the polarizing film 14 and the side of the cavity of the upper mold 16. The number of holding members is not particularly limited.

The minimum value of the distance between the side of the cavity of the upper mold 16 and the polarizing film 14 may be 0.05 mm or larger and 2.0 mm or smaller. The minimum value may be 0.1 mm or larger and 1.0 mm or smaller, 0.3 mm or larger and 0.7 mm or smaller, or 0.2 mm or larger and 0.6 mm or smaller.

The holding member is an adhesive. The adhesive may be put in a columnar (cylindrical, cubic, etc.) form or in a massive form, or in a columnar form, on the rim on the side of the cavity of the upper mold or on the rim of the object-side surface of the polarizing film.

Examples of the material for the upper mold and the lower mold include glass, ceramic, metals, and resins. Among them, glass is preferred.

The upper mold usually has a concave surface (molding surface) located on the cavity side. The convex refracting surface of the lens to be obtained by polymerization curing is formed by the transfer of this concave form. When the upper mold is a glass mold, the molding surface of the upper mold is usually a surface mirror-like finished by roughening, sanding, polishing, or the like.

On the other hand, the lower mold usually has a convex molding surface. The concave refracting surface of the lens to be obtained by polymerization curing is formed by the transfer of this convex form. The lower mold is also usually processed in the same manner as in the upper mold mentioned above.

A gasket or a tape having an adhesive layer on one side (hereinafter, referred to as a "pressure-sensitive adhesive tape") can be used as the sealing member. In the case of using a gasket, the upper mold and the lower mold may be sandwiched and fixed by a clamping member made of an elastic body such as a spring. On the other hand, the pressure-sensitive adhesive tape usually does not need a clamping member.

Examples of the base material of the pressure-sensitive adhesive tape include polyester films such as polyethylene terephthalate, polyolefin films such as polypropylene, polystyrene films such as polystyrene and ABS, polyimide, acetate, paper, cloth, and metals. Among them, polyethylene terephthalate or polypropylene is preferred.

The shape of the pressure-sensitive adhesive tape can be any shape that can be wound around the upper mold and the lower mold. The thickness of the pressure-sensitive adhesive tape can be a thickness that does not cause buckling when the mold is assembled. Usually, a thickness smaller than 200 μm is preferred.

Examples of the pressure-sensitive adhesive of the pressure-sensitive adhesive tape include silicone pressure-sensitive adhesives, acrylic pressure-sensitive adhesives, and natural rubber pressure-sensitive adhesives. A silicone pressure-sensitive adhesive is preferred as a pressure-sensitive adhesive component from the viewpoint of dissolution into the curable composition and heat resistance.

Various assembly methods for use in the cast polymerization method for plastic lenses for eyeglasses can be adopted for the assembly of the mold using the pressure-sensitive adhesive tape. For example, it is preferred to place the upper mold 16, the polarizing film 14, and the lower mold 18 at respective intervals in the presented order, and close the intervals between the upper mold 16 and the lower mold 18 with a sealing member. For more details, see, for example, Japanese Patent Laid-Open No. 2001-330806.

<Injection of Curable Composition>

A curable composition is injected into the mold. The curable composition may be filled into the cavity formed from the upper mold 16, the lower mold 18, and the pressure-sensitive adhesive tape using an injector from an injection hole such that no air bubble remains. The injection hole may be formed between the upper mold 16 and the polarizing film 14 or between the lower mold 18 and the polarizing film 14.

(Curable Composition)

The curable composition may be a reactive curable composition which is cured by polymerization or the like, or may be a phase transition curable composition which is a composition containing a thermoplastic resin in a melted state and is cured by cooling.

Examples of the curable composition include compositions containing a monomer of a resin. Examples of the resin include: polyurethane-based resins such as polythiourethane resin and polyurethane resin; epithio-based resins such as polysulfide resin; and addition resins such as diethylene glycol bisallylacrbonate. Examples of the phase transition curable composition include polycarbonate-based resins. Among them, polythiourethane resin or a polycarbonate-based resin is preferred, and polythiourethane resin is more preferred.

(Polythiourethane Resin)

Monomers of the polythiourethane resin are a polyisocyanate component and a polythiol component.

(Polyisocyanate Component)

Examples of the polyisccyanate component include aromatic polyisocyanate compounds, alicyclic polyisocyanate compounds, and linear or branched aliphatic polyisocyanate compounds.

Examples of the aromatic polyisocyanate compound include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylenebis(phenyl isocyanate), 4,4'-methylenebis(2-methylphenyl isocyanate), bibenzyl-4,4'-diisocyanate, bis(isocyanatophenyl)ethylene, xylylene diisocyanate, bis(isocyanatoethyl)benzene, bis(isocyanatopropyl)benzene, α,α,α$^1$,α$^1$-tetramethylxylylene diisocyanate, bis(isocyanatobutyl)benzene, bis(isocyanatomethyl)naphthalene, bis(isocyanatomethylphenyl) ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methoxy-4-isocyanatophenyl) disulfide, and bis(4-methoxy-3-isocyanatophenyl) disulfide.

Examples of the alicyclic polyisocyanate compound include diisocyanatocyclohexane, isophorone diisocyanate, bis(isocyanatomethyl)cyclohexane, dicyclohexylmethane diisocyanate, bis(isocyanatomethyl)bicyclo[2.2.1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl)sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanate-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octane diisocyanate, 1,2-diisothiocyanatoethane, and 1,6-diisothiocyanatohexane.

One or two or more of these polyisocyanate compounds may be used.

The polyisocyanate compound may be one or more compounds selected from the group consisting of xylylene diisocyanate, isophorone diisocyanate, hexamethylene diisocyanate, bis(isocyanatomethyl)cyclohexane, dicyclohexylmethane diisocyanate, and bis(isocyanatomethyl)bicyclo[2.2.1]heptane, or one or more compounds selected from the group consisting of xylylene diisocyanate, bis(isocyanatomethyl)cyclohexane, dicyclohexylmethane diisocyanate, and bis(isocyanatomethyl)bicyclo[2.2.1]heptane.

(Polythiol Component)

Examples of the polythiol component include ester compounds of polyol compounds and mercapto group-containing carboxylic acid compounds, linear or branched aliphatic polythiol compounds, polythiol compounds having an alicyclic structure, and aromatic polythiol compounds.

In the ester compound of a polyol compound and a mercapto group-containing carboxylic acid compound, the polyol compound is a compound having two or more hydroxy groups in the molecule. Examples of the polyol compound include ethylene glycol, diethylene glycol, propanediol, propanetriol, butanediol, trimethylolpropane, bis(2-hydroxyethyl) disulfide, pentaerythritol, and dipentaerythritol.

Examples of the mercapto group-containing carboxylic acid compound include thioglycolic acid, mercaptopropionic acid, thiolactic acid compounds, and thiosalicylic acid.

Examples of the ester compound of the polyol compound and the mercapto group-containing carboxylic acid compound include butanediol bis(2-mercaptoacetate), butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), dipentaerythritol hexakis(3-mercaptoacetate), and dipentaerythritol hexakis(3-mercaptopropionate).

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethoxybutane-1,2-dithiol, 2,3-dimercapto-1-propanol, 1,2-dimercaptopropyl methyl ether, 2,3-dimercaptopropyl methyl ether, 2,2-bis(mercaptomethyl)-1,3-propanedithiol, bis(2-mercaptoethyl) ether, bis(2-mercaptoethyl) sulfide, bis(2-mercaptoethyl) disulfide, bis[(2-mercaptoethyl)thio]-3-mercaptopropane, 1,2-bis(2-mercaptoethylthio)-3-mercaptopropane, and bis(mercaptomethyl)-3,6,9-trithiaundecanedithiol.

Examples of the polythiol compound having an alicyclic structure include 1,1-cyclohexanedithiol, 1,2-cyclohexanedithiol, methylcyclohexanedithiol, bis(mercaptomethyl)cyclohexane, and bis(mercaptomethyl)dithiane.

Examples of the aromatic polythiol compound include aromatic polythiol compounds such as dimercaptobenzene, bis(mercaptomethyl)benzene, bis(mercaptoethyl)benzene, trimercaptobenzene, tris(mercaptomethyl)benzene, tris(mercaptoethyl)benzene, dimercaptobiphenyl, 4,4'-dimercaptobibenzyl, 2,5-toluenedithiol, naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane.

One of these polythiol compounds may be used singly, or two or more thereof may be used in combination.

The polythiol compound may be one or more compounds selected from the group consisting of bis(mercaptomethyl)dithiane, pentaerythritol tetrakis(2-mercaptoacetate), pentaerythritol tetrakis(3-mercaptopropionate), 1,2-bis(2-mercaptoethylthio)-3-mercaptopropane, bis(mercaptomethyl)-3,6,9-trithiaundecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), or one or more compounds selected from the group consisting of bis(mercaptomethyl)-3,6,9-trithiaundecanedithiol, pentaerythritol tetrakis(3-nercaptopropionate), and 1,2-bis(2-mercaptoethylthio)-3-mercaptopropane.

The bis(mercaptomethyl)-3,6,9-trithiaundecanedithiol may be a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

Preferred examples of the combination of the polyisocyanate component and the polythiol component include (1) a polyisocyanate component comprising xylylene diisocyanate, and a polythiol component comprising a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol, (2) a polyisocyanate component comprising bis(isocyanatomethyl)bicyclo[2.2.1]heptane, and a polythiol component comprising pentaerythritol tetrakis(3-mercaptopropionate) and 1,2-bis(2-mercaptoethylthio)-3-mercaptopropane, and (3) a polyisocyanate component comprising dicyclohexylmethane diisocyanate, and a polythiol component comprising a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

In short, the first lens element part 110 and the second lens element part 120 may contain polythiourethane resin obtained from the isocyanate component mentioned above and the polythiol component mentioned above.

The blending ratio between the polyisocyanate component and the polythiol component may be 0.5 or more, or 0.80 or more, or 0.95 or more, in terms of an isocyanate group/mercapto group molar ratio. The molar ratio may be 2.0 or less, 1.20 or less, or 1.05 or less.

The polyisocyanate component and the polythiol component may additionally be blended with various additives such as an ultraviolet absorber, a polymerization catalyst, a mold release agent, an antioxidant, an anti-coloring agent, a fluorescent brightening agent, and a bluing agent. The curable composition is obtained by mixing these various components by a usual method.

(Ultraviolet Absorber)

The ultraviolet absorber may have a maximum absorption wavelength of 345 nm or more in a chloroform solution.

Examples of the ultraviolet absorber include benzophenone compounds, benzotriazole compounds, dibenzoylmethane, and 4-tert-butyl-4'-methoxybenzoylmethane.

Examples of the benzophenone compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone and 2,2'-dihydroxy-4-methoxybenzophenone.

Examples of the benzotriazole compound include benzotriazole compounds such as 2-(2-hydroxy-5-methylphenyl)-2H-benzotriazole, 2-(2-hydroxy-3,5-di-tert-butylphenyl)-5-chloro-2H-benzotriazole, 2-(2-hydroxy-3-tert-butyl-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-tert-octylphenyl)-2H-benzotriazole and 2-(2-hydroxy-4- octyloxyphenyl)-2H-benzotriazole. One of these compounds may be used singly, or two or more types thereof may be used in combination.

The amount of the ultraviolet absorber added may be 0.01 parts by mass or more and 5 parts by mass or less, 0.05 parts by mass or more and 3 parts by mass or less, 0.1 parts by mass or more and 2 parts by mass or less, 0.3 parts by mass or more and 2 parts by mass or less, 0.5 parts by mass or more and 2 parts by mass or less, or 0.8 parts by mass or more and 2 parts by mass or less, per 100 parts by mass in total of the polythiol component and the polyisocyanate component.

(Polymerization Catalyst)

The polymerization catalyst may be an organotin compound, or an alkyl tin halide compound or an alkyl tin compound.

Examples of the alkyl tin halide compound include dibutyl tin dichloride, dimethyl tin dichloride, monomethyl tin trichloride, trimethyl tin chloride, tributyl tin chloride, tributyl tin fluoride, and dimethyl tin dibromide.

Examples of the alkyl tin compound include dibutyl tin diacetate and dibutyl tin dilaurate.

Among them, dibutyl tin dichloride, dimethyl tin dichloride, dibutyl tin diacetate, or dibutyl tin dilaurate is preferred.

The amount of the polymerization catalyst added may be 0.001 parts by mass or more and 1 part by mass or less, 0.005 parts by mass or more and 0.5 parts by mass or less, or 0.005 parts by mass or more and 0.1 parts by mass or less, per 100 parts by mass in total of the polythiol component and the polyisocyanate component.

(Mold Release Agent)

The curable composition may contain a mold release agent and may contain a phosphoric acid ester compound as the mold release agent. The phosphoric acid compound thus contained can not only enhance mold releasability from molds but can improve the adhesiveness between the polarizing film and the base material.

Examples of the phosphoric acid compound include isopropyl acid phosphate, butyl acid phosphate, octyl acid phosphate, nonyl acid phosphate, decyl acid phosphate, isodecyl acid phosphate, isodecyl acid phosphate, tridecyl acid phosphate, stearyl acid phosphate, propylphenyl acid phosphate, butylphenyl acid phosphate, and butoxyethyl acid phosphate. The phosphoric acid ester compound may be any of a phosphoric acid monoester compound and a phosphoric acid diester compound and may be a mixture of a phosphoric acid monoester compound and a phosphoric acid diester compound.

The amount of the mold release agent added may be 0.01 parts by mass or more and 1.00 part by mass or less, or 0.05 parts by mass or more and 0.50 parts by mass or less, per 100 parts by mass in total of the polythiol component and the polyisocyanate component.

(Addition Resin)

A monomer of the addition resin comprises diethylene glycol bisallylacrbonate. The addition resin is a cured product of an addition polymerizable composition comprising diethylene glycol bisallylacrbonate. The first lens element part 110 and the second lens element part 120 may contain the cured product of the addition polymerizable composition mentioned above.

The addition polymerizable composition may comprise an additional monomer.

The monomer may include a monomer having two or more polymerizable unsaturated bonds in the molecule for obtaining a three-dimensionally cross-linked optical resin.

Examples of the polymerizable unsaturated bond include a (meth)acrylate group, an allyl group, and a vinyl group. The (meth)acrylate group is at least one group selected from the group consisting of a methacrylate group and an acrylate group.

Among them, at least one group selected from the group consisting of a methacrylate group and an allyl group is preferred.

The monomer having two or more polymerizable unsaturated bonds in the molecule may comprise diethylene glycol bisallylacrbonate and may comprise diethylene glycol bisallylacrbonate, benzyl methacrylate, diallyl phthalate and alkyl methacrylate containing an alkyl group having 1 to 4 carbon atoms.

The amount of the diethylene glycol bisallylacrbonate blended may be 5% by mass or more, 10% by mass or more, or 20% by mass or more, and may be 100% by mass or less, 80% by mass or less, 50% by mass or less, or 40% by mass or less, with respect to the total amount of the monomers.

In the case of using benzyl methacrylate, diallyl phthalate and alkyl methacrylate containing an alkyl group having 1 to 4 carbon atoms in combination, the amount of the diethylene glycol bisallylacrbonate blended may be 5% by mass or more, 10% by mass or more, or 20% by mass or more, and may be 40% by mass or less, or 35% by mass or less, with respect to the total amount of the monomers.

The amount of the benzyl methacrylate blended may be 5% by mass or more, 10% by mass or more, or 15% by mass or more, and may be 40% by mass or less, 30% by mass or less, or 25% by mass or less, with respect to the total amount of the monomers.

The diallyl phthalate is one or two compounds selected from the group consisting of diallyl isophthalate and diallyl terephthalate.

The amount of the diallyl phthalate blended may be 14% by mass or more, 20% by mass or more, or 30% by mass or more, and may be 88% by mass or less, 70% by mass or less, or 60% by mass or less, with respect to the total amount of the monomers.

The alkyl methacrylate containing an alkyl group having 1 to 4 carbon atoms is at least one compound selected from the group consisting of methyl methacrylate, ethyl methacrylate, n-propyl methacrylate, iso-propyl methacrylate, n-butyl methacrylate, sec-butyl methacrylate, iso-butyl methacrylate, and tert-butyl methacrylate.

The amount of the alkyl methacrylate blended may be 1% by mass or more, 2% by mass or more, or 3% by mass or more, and may be 6% by mass or less, or 5% by mass or less, with respect to the total amount of the monomers.

Examples of the radical initiator for use in polymerization include 1,1-azobiscyclohexane carbonate, diisopropyl peroxycarbonate, 1,1'-azobiscyclohexane nitrate, and di-tert-butyl peroxide.

The amount of the radical initiator blended may be 0.1 parts by mass or more, 0.5 parts by mass or more, or 1.0 part by mass or more, and may be 10 parts by mass or less, 8 parts by mass or less, or 5 parts by mass or less, per 100 parts by mass of the monomers.

<Curing of Curable Composition>

The mold into which the curable composition has been injected can be put in a heating furnace and heated to cure the curable composition. In this context, the heating conditions can be determined depending on the type of the curable composition. The temperature may be elevated to 0° C. or higher and 150° C. or lower, 10° C. or higher and 130° C. or lower, for 5 hours or longer and 50 hours or shorter, or 10 hours or longer and 25 hours or shorter, for curing. After the curing, polarizing lens 100 in which the polarizing film 14 is placed in the inside of the base material is obtained.

<Annealing of Polarizing Lens; Temperature $T_2$>

The obtained polarizing lens 100 is annealed at temperature $T_2$. In the present embodiment, the temperature $T_2$ refers to the temperature of an atmosphere in which heating treatment for the annealing of the polarizing lens is performed. The annealing of the polarizing lens usually removes internal strain resulting from the curing of the curable composition. A polarizing film having a high luminous transmittance and a decreased rate of contraction by the exposure of a polarizing lens to high-temperature conditions is susceptible, particularly, to deformation. In the production method of the present embodiment, the deformation of the polarizing film in the annealing of the polarizing lens can be prevented by setting the temperature $T_1$ to higher than $T_2$ at the time of drying of the polarizing film. Hence, the polarizing lens is obtained with astigmatism kept low. The annealing described above can be performed in the atmosphere.

The temperature $T_2$ may be 100° C. or higher and 130° C. or lower, 110° C. or higher and 125° C. or lower, or 115° C. or higher and 125° C. or lower. When the temperature $T_2$ falls within the range, the polarizing lens is obtained with astigmatism kept lower.

The difference between the temperature $T_1$ and the temperature $T_2$ ($T_1-T_2$) may be 5° C. or more and 40° C. or less, 10° C. or more and 30° C. or less, or 15° C. or more and 25° C. or less. When the difference ($T_1-T_2$) falls within the range, the polarizing lens is obtained with astigmatism kept lower.

The temperature $T_2$ may be a temperature higher by 3° C. or more than the glass transition temperature of the polarizing lens, or a temperature higher by 5° C. or more than the glass transition temperature of the polarizing lens. When the temperature $T_2$ falls within the range, the polarizing lens is obtained with astigmatism kept lower.

Various methods can be adopted as methods for the annealing. A scheme of treatment within the heating furnace heated to the temperature $T_2$ can be used. The annealing time is not particularly limited. The annealing may be performed on the polarizing lens demolded after curing of the curable composition, or may be performed in a state put in the mold.

The polarizing lens can be obtained by taking the mold out of the heating furnace, peeling the pressure-sensitive adhesive tape, and releasing the upper mold 16 and the lower mold 18.

When the obtained polarizing lens is a semi-finished lens, eyeball-side surface 121 of the polarizing lens 100 can then be processed by grinding and/or polishing in a curve generator and a polishing apparatus to obtain an eyeglass lens for vision correction that meets a prescribed power.

(Formation of Functional Layer)

In the polarizing lens, the functional layer mentioned above may be formed. A method known in the art such as the method mentioned above is used as a method for forming each layer.

According to the embodiment of the present disclosure described above, a polarizing lens having a high luminous transmittance and degree of polarization with astigmatism kept low is obtained.

EXAMPLES

Hereinafter, the present embodiment will be more specifically described with reference to Examples and Comparative Examples. However, the present disclosure is not limited by Examples given below by any means.

[Measurement Method]

<Luminous Transmittance>

The luminous transmittance was measured in accordance with JIS T7333: 2005.

<Degree of Polarization>

The degree of polarization ($P_{eff}$) was calculated according to the expression given below in accordance with ISO8980-3 by using an ultraviolet-visible-near infrared spectrophotometer "V-660" (manufactured by JASCO Corp.) and determining a luminous transmittance ($T_{//}$) when the transmission axis of a polarizing element is in a direction parallel to linear polarization light and a luminous transmittance ($T\perp$) when the transmission axis of the polarizing element is in an intersecting direction. The luminous transmittance ($T_{//}$) and the luminous transmittance ($T\perp$) were measured using a visible spectrophotometer and a polarizer (Glan-Thompson prism). Measurement light was incident from the object-side surface of the polarizing lens.

$$P_{eff}(\%)=[(T_{//}-T\perp)/(T_{//}+T\perp)]\times 100$$

<Astigmatism>

The maximum radius of curvature (mm) (Rmax) and the minimum radius of curvature (mm) (Rmin) at the geometric center of the object-side surface of the polarizing lens were measured in a radius-of-curvature measurement apparatus "FOCOVISON" (manufactured by Automation & Robotics). The difference in curvature between the maximum radius of curvature (mm) and the minimum radius of curvature (mm) (Rmax−Rmin) was regarded as astigmatism and used as an index for the deformation of the polarizing lens.

Example A1: Production of Polarizing Lens A1

1. Contraction, Curving, and Drying of Polarizing Film

A drawn film (thickness: 35 μm) containing a dichroic dye and polyvinyl alcohol was placed as a polarizing film in a constant temperature and humidity apparatus and moistened by moistening treatment such that the water content at the start of curving was approximately 4%. The moistened polarizing film was left at room temperature (20 to 25° C.) for approximately 2 minutes and thereby contracted to a maximum rate of contraction of 11%. Then, the film was curved by the method described above with reference to FIG. 5. The curving was also performed at room temperature.

Subsequently, the demolded curved polarizing film was heated at 140° C. for 65 minutes using a commercially available hot air circulating oven. After the heating, adhesive columns were established at four locations on the rim on the side of the cavity of the upper mold. Then, the polarizing film was interposed on the adhesive columns, and the intervals between the upper mold and the lower mold were closed using a pressure-sensitive adhesive tape as a sealing member to assemble a mold. The surface shape of the upper mold and the lower mold was a spherical surface with an inside diameter of 80 mm and a radius of curvature of 130.4 mm.

2. Molding of Lens by Cast Polymerization Method, and Mold Release 50.6 parts by mass of bis(isocyanatomethyl)bicyclo[2.2.1]heptane, 23.90 parts by mass of pentaerythritol tetrakis(3-mercaptopropionate), 25.48 parts by mass of 1,2-bis(2-mercaptoethylthio)-3-mercaptopropane, 2.8 parts by mass of an ultraviolet absorber 2-(2-hydroxy-5-tert-octylphenyl)-2H-benzotriazole, 0.050 parts by mass of an internal mold release agent phosphoric acid ester compound "ZELEC UN" (product name, manufactured by Stepan Company), and 0.0250 parts by mass of a bluing agent were added and mixed as raw materials for a base material for an eyeglass lens, and then thoroughly stirred. Into the raw materials for a base material for an eyeglass lens thus completely dispersed or dissolved, 0.05 parts by mass of a catalyst dibutyl tin dichloride were added, and the mixture was thoroughly stirred at room temperature to prepare a homogenous liquid. The composition was degassed for 30 minutes while stirred with the pressure reduced to 5 mmHg to prepare a curable composition.

the object-side surface is the intersecting point between a perpendicular passing through the center of a circle of the polarizing lens planarly viewed, and the eyeball-side surface.

Examples A2 to A8 and Comparative Examples A1 and A2: Production of Polarizing Lenses A2 to A8, A51 and A52

Polarizing lenses A2 to A8, A51 and A52 were obtained in the same manner as in Example A1 except that the maximum rate of contraction and drying temperature of the polarizing film were as shown in Table 1.

TABLE 1

| | | Example/Comparative Example | | | | |
|---|---|---|---|---|---|---|
| | | Example A1 | Example A2 | Example A3 | Example A4 | Example A5 |
| Polarizing lens | | A1 | A2 | A3 | A4 | A5 |
| Polarizing film | Maximum rate of contraction (%) | 11 | 12 | 14 | 16 | 18 |
| | Drying temperature $T_1$ (° C.) | 140 | 140 | 140 | 140 | 140 |
| Polarizing lens | Annealing $T_2$ (° C.) | 120 | 120 | 120 | 120 | 120 |
| | Annealing time (h) | 2 | 2 | 2 | 2 | 2 |
| Expression (1): $T_1 > T_2$ | | ○ | ○ | ○ | ○ | ○ |
| Evaluation | Luminous transmittance (%) | 32.3 | 32.8 | 32.1 | 32.5 | 31.3 |
| | Degree of polarization | 99.1 | 98.9 | 98.9 | 99.0 | 98.9 |
| | Astigmatism | 0.04 | 0.04 | 0.04 | 0.05 | 0.03 |

| | | Example/Comparative Example | | | | |
|---|---|---|---|---|---|---|
| | | Example A6 | Example A7 | Example A8 | Comparative Example A1 | Comparative Example A2 |
| Polarizing lens | | A6 | A7 | A8 | A51 | A52 |
| Polarizing film | Maximum rate of contraction (%) | 6 | 10 | 10 | 10 | 36 |
| | Drying temperature $T_1$ (° C.) | 140 | 130 | 150 | 120 | 120 |
| Polarizing lens | Annealing $T_2$ (° C.) | 120 | 120 | 120 | 120 | 120 |
| | Annealing time (h) | 2 | 2 | 2 | 2 | 2 |
| Expression (1): $T_1 > T_2$ | | ○ | ○ | ○ | x | x |
| Evaluation | Luminous transmittance (%) | 33.6 | 33.5 | 32.5 | 34.61 | 28.7 |
| | Degree of polarization | 99.1 | 99.0 | 99.0 | 98.5 | 98.4 |
| | Astigmatism | 0.12 | 0.13 | 0.09 | 0.16 | 0.01 |

The prepared curable composition was injected into a mold (base curve: 2.50 bases) in which the curved polarizing film mentioned above was placed in the inside.

Then, the mold was placed in a heating furnace and kept at 30° C. for 7 hours, and then, the temperature was elevated from 30° C. to 120° C. over 10 hours for curing by heating.

After the curing by heating, polarizing lens A1 was obtained by taking the mold out of the heating furnace, peeling the pressure-sensitive adhesive tape, and releasing the upper mold and the lower mold to demold the polarizing lens. The obtained polarizing lens A1 was placed in a heating furnace and annealed at 120° C. for 2 hours. The obtained polarizing lens A1 had refractive index ne of 1.60 and a glass transition temperature of 118° C.

Various physical properties of the obtained polarizing lens A1 were measured by the measurement methods mentioned above. The object-side surface of the polarizing lens was designed as a spherical surface, and the geometric center of As seen from the results of these Examples and Comparative Examples, the production method according to the present embodiment produces a polarizing lens having a high luminous transmittance and low astigmatism.

From the comparison of Example A1 with Comparative Examples A1 and A2, it is evident that: a high luminous transmittance is obtained by decreasing the maximum rate of contraction; and astigmatism can be kept low by further satisfying the conditions of the expression (1).

From the results of Examples A1 to A6, it is evident that a high luminous transmittance is obtained and astigmatism can be kept low, by satisfying the conditions of the expression (1) in a wide range of the maximum rate of contraction.

From the results of Examples A1, A7, and A8, it is evident that a high luminous transmittance is obtained and astigmatism can be kept low, by satisfying the conditions of the expression (1) in a wide range of the drying temperature $T_1$.

Example B1: Dyeing

The polarizing lens A1 obtained in Example A1 was dyed by dipping in a dyeing solution containing a red dye. The luminous transmittance of the dyed polarizing lens was measured by the method mentioned above and was consequently 32.8%.

Example B2: Dyeing

The polarizing lens A1 obtained in Example A1 was dyed by treatment in a dyeing solution containing a yellow dye. The luminous transmittance of the dyed polarizing lens was measured by the method mentioned above and was consequently 31.7%.

Example B3: Dyeing

The polarizing lens A1 obtained in Example A1 was dyed by treatment in a dyeing solution containing a blue dye. As a result of visually observing the dyed polarizing lens, blue color was favorably developed even though the blue dye, a dark color dye having low chromogenic properties, was used.

Example B4: Dyeing

The polarizing lens A1 obtained in Example A1 was dyed by treatment in a dyeing solution containing a green dye. As a result of visually observing the dyed polarizing lens, green color was favorably developed even though the green dye, a dark color dye having low chromogenic properties, was used.

As seen from the results of these Examples and Comparative Examples, the production method according to the present embodiment produces a polarizing lens having a high luminous transmittance and low astigmatism.

REFERENCE SIGNS LIST

14 . . . polarizing film, 16 . . . upper mold, 16a . . . flange part, 18 . . . lower mold, 20a, 20b, 20c, 20d . . . holding member, 100 . . . polarizing lens, 110 . . . first lens element part, 111 . . . object-side surface, 120 . . . second lens element part, 121 . . . eyeball-side surface, 300 . . . lens shape, W1 . . . minimum value

The invention claimed is:

1. A method for producing a polarizing lens, comprising:
    contracting a polarizing film at a rate of contraction, represented by the following expression and being a rate of contraction in a direction in which the rate of contraction is maximized, of 5% or more and 30% or less under moist conditions;
    the rate of contraction (%)=([width of the polarizing film before contraction]−[width of the polarizing film after contraction])/[width of the polarizing film before contraction]×100;
    processing the polarizing film into a curve;
    drying the polarizing film at temperature $T_1$;
    providing a mold having a cavity in which the polarizing film is placed in the inside;
    injecting a curable composition into the cavity;
    curing the curable composition to obtain a polarizing lens in which the polarizing film is placed in the inside; and
    annealing the polarizing lens at temperature $T_2$, wherein a relationship between the temperature $T_1$ and the temperature $T_2$ satisfies the following expression (1):

$$T_1 > T_2 \quad (1),$$

the temperature $T_1$ is higher than 120° C. and 160° C. or lower,
    the temperature $T_2$ is 110° C. or higher, and
    a difference between the temperature $T_1$ and the temperature $T_2$ ($T_1 - T_2$) is 10° C. or more and 40° C. or less.

2. The method for producing a polarizing lens according to claim 1, wherein
    the temperature $T_2$ is 110° C. or higher and 130° C. or lower.

3. The method for producing a polarizing lens according to claim 1, wherein
    the polarizing lens has a glass transition temperature of 80° C. or higher and 150° C. or lower.

4. The method for producing a polarizing lens according to claim 1, wherein
    the preparation of the mold comprises placing an upper mold, the polarizing film after the drying, and a lower mold at respective intervals in the presented order, and closing the intervals between the upper mold and the lower mold with a sealing member.

5. The method for producing a polarizing lens according to claim 4, wherein
    a minimum value of a distance between the side of the cavity of the upper mold and the polarizing film is 0.05 mm or larger and 2.0 mm or smaller.

6. The method for producing a polarizing lens according to claim 5, wherein
    the polarizing lens has a negative power.

7. The method for producing a polarizing lens according to claim 2, wherein
    the polarizing lens has a glass transition temperature of 80° C. or higher and 150° C. or lower.

8. The method for producing a polarizing lens according to claim 2, wherein
    the preparation of the mold comprises placing an upper mold, the polarizing film after the drying, and a lower mold at respective intervals in the presented order, and closing the intervals between the upper mold and the lower mold with a sealing member.

9. The method for producing a polarizing lens according to claim 3, wherein
    the preparation of the mold comprises placing an upper mold, the polarizing film after the drying, and a lower mold at respective intervals in the presented order, and closing the intervals between the upper mold and the lower mold with a sealing member.

* * * * *